United States Patent [19]

Idel et al.

[11] 4,303,781

[45] Dec. 1, 1981

[54] PROCESS FOR THE PREPARATION OF POLYARYLENE SULPHIDES

[75] Inventors: Karsten Idel, Krefeld; Josef Merten, Korschenbroich, both of Fed. Rep. of Germany

[73] Assignee: Bayer Aktiengesellschaft, Fed. Rep. of Germany

[21] Appl. No.: 171,304

[22] Filed: Jul. 23, 1980

[30] Foreign Application Priority Data

Jul. 28, 1979 [DE] Fed. Rep. of Germany ....... 2930710

[51] Int. Cl.³ .............................................. C08G 75/14
[52] U.S. Cl. .................. 528/388; 260/37 R; 260/45.7 P
[58] Field of Search ..................... 528/388; 260/45.7 P

[56] References Cited

U.S. PATENT DOCUMENTS 3,658,753  4/1972  Reed et al. .......................... 528/388
4,064,114  12/1977  Edmonds, Jr. ...................... 528/388

*Primary Examiner*—Melvyn I. Marquis
*Attorney, Agent, or Firm*—Connolly and Hutz

[57] ABSTRACT

Preparation of a polyarylene sulphide by polycondensing a substituted p-dihalogenobenzene and optionally a polyhalogeno aromatic compound having at least three halo substituents with an alkali metal sulphide in a polar solvent in the presence of a catalytic amount of a trialkali metal phosphate.

8 Claims, No Drawings

PROCESS FOR THE PREPARATION OF POLYARYLENE SULPHIDES

Polyarylene sulphides are known in principle (see, for example, U.S. Pat. No. 2,538,941 and U.S. Pat. No. 2,513,188). They can be prepared in the absence of a solvent from the corresponding halogenated aromatic compounds and alkali metal sulphides or alkaline earth metal sulphides.

The preparation by means of alkali metal sulphides can also be effected with the additional use of polar solvents (in this context, see, for example, U.S. Pat. No. 3,354,129 and German Offenlegungsschrift No. 1,468,782), and copper catalysts can also be used if appropriate.

According to German Offenlegungsschrift No. 2,453,749 and U.S. Pat. No. 3,919,177, alkali metal carboxylates are used as catalysts for the preparation of polyarylene sulphides. Amides are used as solvents and inorganic bases are used to activate the sulphur donor.

According to German Offenlegungsschrift No. 2,623,363 and U.S. Pat. No. 4,038,261, lithium chloride and lithium carboxylate are used as catalysts for the preparation of arylene sulphide polymers. N-Methylpyrrolidone and alkali metal hydroxides complete the catalyst system.

Catalysts used for the preparation of polyphenylene sulphides are alkali metal carbonates in combination with alkali metal carboxylates, according to U.S. Pat. No. 4,038,259, lithium halides, according to U.S. Pat. No. 4,038,263, and lithium carbonates, according to U.S. Pat. No. 4,039,518.

According to German Offenlegungsschrift No. 2,623,362 and U.S. Pat. No. 4,038,262, lithium halides or alkali metal carboxylates are used as catalysts for the preparation of arylene sulphide polymers. N-Methylpyrrolidone and alkali metal hydroxides complete the catalyst system.

According to German Offenlegungsschrift No. 2,623,333 and U.S. Pat. No. 4,064,114, lithium acetate is used as the catalyst for the preparation of arylene sulphide polymers. N-Alkylpyrrolidone and if appropriate, as bases, alkali metal hydroxides and/or alkali metal carbonates complete the catalyst system.

According to German Offenlegungsschrift No. 2,817,731 and U.S. Pat. No. 4,116,947, sodium carboxylates in the presence of defined amounts of water are used as catalysts for the preparation of branched arylene sulphide polymers.

In contrast, the present invention relates to a process for the preparation of polyarylene sulphides, which can optionally be branched, from (a) p-dihalogenobenzenes which consist of 50 to 100 mol % of compounds of the formula 1

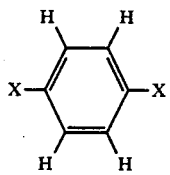

and of 0 to 50 mol % of dihalogenobenzenes of the formula 2

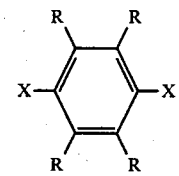

wherein X is fluorine, chlorine, bromine or iodine and the symbols R are identical or different and can be hydrogen, $C_1$–$C_{20}$-alkyl, $C_5$–$C_{20}$-cycloalkyl, $C_6$–$C_{24}$-aryl, $C_7$–$C_{24}$-alkaryl or $C_7$–$C_{24}$-aralkyl, but at least one R is other than hydrogen, (b) 0 to 2.0 mol %, relative to the p-dihalogenobenzene constituent, of a polyhalogenoaromatic compound of the formula 3

$$ArX_n \qquad 3$$

wherein

Ar is any desired aromatic radical with 6 to 24 C atoms and at least 3 free valencies, X has the same meaning as in Formulae 1 and 2 and $n \geq 3$, and (c) an alkali metal sulphide, preferably sodium sulphide or potassium sulphide or mixtures thereof, preferably in the form of the hydrates or aqueous mixtures, and if appropriate together with alkali metal hydroxides, in (d) a polar solvent, preferably an amide or lactam, in particular a N-alkyllactam, the molar ratio of (a) to (c) being in the range from 0.98:1 to 1.02:1 and the molar ratio of (c) to (d) being in the range from 1:1 to 1:10, over a polycondensation period of up to 60 hours, preferably of 2 to 15 hours, and at a polycondensation temperature of between 160° and 285° C., preferably between 190° and 275° C., which is characterised in that the reaction is carried out in the presence of 0.05–2.0 mols, preferably 0.1–1.5 mols, per 1 mol of alkali metal sulphide, of tri-alkali metal phosphates, in particular of a trisodium or tripotassium phosphate, or mixtures thereof, the tri-alkali metal phosphates preferably being employed in the form of their hydrates or in aqueous mixtures, and one or more dehydration stages being effected before addition of the p-halogenobenzenes.

Polyarylene sulphides with higher intrinsic viscosities and a lower melt flow are obtained by the process according to the invention than by an analogous process without the use of tri-alkali metal phosphates.

The polyarylene sulphides obtainable according to the invention are thus thermoplastics which have a good pattern of mechanical properties and at the same time can be readily processed.

The alkali metal sulphides used are preferably sodium sulphide and potassium sulphide ($Na_2S$ and $K_2S$) or mixtures thereof, in general as the hydrate or as mixtures with water.

The alkali metal phosphates according to the invention are likewise preferably employed in the form of their hydrates or in mixtures with water, trisodium phosphate and tripotassium phosphate, for example tertiary sodium phosphate $Na_3PO_4 \times 12H_2O$ or tertiary potassium phosphate $K_3PO_4 \times 3H_2O$, being particularly preferably employed.

However, the phosphates according to the invention can also be produced directly in the reaction solution from the primary or secondary phosphates, i.e. the dihydrogen or hydrogen phosphates, by adding appropriate stoichiometric amounts of alkali metal hydroxide, thus, for example, by bringing together an aqueous solution of potassium dihydrogen phosphate $KH_2PO_4$ and 2 mols of potassium hydroxide solution, or disodium hydrogen phosphate $Na_2HPO_4 \times 12H_2O$ and 1 mol of sodium hydroxide solution.

It is also possible, of course, to neutralise the corresponding alkali metal hydroxides, if appropriate in the form of aqueous mixtures, directly in the reaction solution, with phosphoric acid in the desired stoichiometric ratio, a particularly homogeneous distribution of the resulting phosphates according to the invention being achieved.

It is possible to use either one tri-alkali metal phosphate or several different tri-alkali metal phosphates.

The alkali metal sulphides can also be obtained in or out of the reaction solution, from hydrogen sulphide or the alkali metal bisulphides and corresponding stoichiometric amounts of alkali metal hydroxides, by neutralisation. When the pure alkali metal sulphides are used, it is also advisable to additionally add alkali metal hydroxides in order to neutralise alkali metal bisulphides which are frequently present as concomitant materials.

Examples of the p-dihalogenobenzenes of the formula 1 to be used according to the invention are: p-difluorobenzene, p-dichlorobenzene, p-dibromobenzene, p-diiodobenzene, 1-fluoro-4-chlorobenzene, 1-fluoro-4-bromobenzene, 1-chloro-4-bromobenzene, 1-chloro-4-iodobenzene and 1-bromo-4-iodobenzene. They can be used by themselves or as mixtures with one another.

Examples of the p-dihalogenobenzenes of the formula 2 to be used according to the invention are: 2,5-dichlorotoluene, 2,5-dichloroxylene, 1-ethyl-2-dichlorobenzene, 1-ethyl-2,5-dibromobenzene, 1-ethyl-2-bromo-5-chlorobenzene, 1,2,4,5-tetramethyl-3,6-dichlorobenzene, 1-cyclohexyl-2,5-dichlorobenzene, 1-phenyl-2,5-dichlorobenzene, 1-benzyl-2,5-dichlorobenzene, 1-phenyl-2,5-dibromobenzene, 1-p-tolyl-2,5-dichlorobenzene, 1-p-tolyl-2,5-dibromobenzene and 1-hexyl-2,5-dichlorobenzene. They can be used by themselves or as mixtures with one another.

Examples of the polyhalogenoaromatic compounds of the formula 3 to be used according to the invention are: 1,2,3-trichlorobenzene, 1,2,4-trichlorobenzene, 1,2,4-tribromobenzene, 1,2,4-triiodobenzene, 1,3,5-trichloro-2,4,6-trimethylbenzene, 1,2,3-trichloronaphthalene, 1,2,4-trichloronaphthalene, 1,2,6-trichloronaphthalene, 2,3,4-trichlorotoluene, 2,4,6-trichlorotoluene, 1,2,3,4-tetrachloronaphthalene, 1,2,4,5-tetrachlorobenzene and 2,2',4,4'-tetrachlorobiphenyl.

In general, any polar solvent which ensures adequate solubility of the organic and inorganic reactants under the reaction conditions can be used for the reaction. However, lactams and amides are preferably used, and N-alkyllactams are particularly preferably used.

Lactams in the context of the present invention are those of aminoacids which have 3 to 5 C atoms and which can optionally carry substituents which are inert under the reaction conditions, such as, for example, an alkyl radical with 1 to 5 C atoms, on the carbon skeleton.

N-Alkyllactams in the context of the present invention are defined in the same way as the lactams according to the invention, but they additionally carry an alkyl radical with 1 to 3 C atoms on the nitrogen atom.

Amides in the context of the invention are those of carboxylic acids of 1 to 5 C atoms, and preferably those of carboxylic acids which have 1 to 5 C atoms and carry two alkyl radicals with 1 to 3 C atoms on the amide nitrogen.

Examples of possible solvents are: dimethylformamide, dimethylacetamide, caprolactam, N-methylcaprolactam, N-ethylcaprolactam, N-isopropylcaprolactam, N-methyl-2-pyrrolidone, N-ethyl-2-pyrrolidone, N-isopropyl-2-pyrrolidone, N-methyl-3-methyl-2-pyrrolidone, N-methyl-5-methyl-2-pyrrolidone, N-methyl-3,4,5-trimethyl-2-pyrrolidone, N-methyl-2-piperidone, N-ethyl-2-piperidone, N-methyl-6-methyl-2-piperidone, N-methyl-3-ethyl-2-piperidone, N-methyl-2-oxohexamethyleneimine and N-ethyl-2-oxohexamethyleneimine.

Mixtures of the above solvents can also be chosen.

In the process according to the invention, the p-dihalogenobenzene, if appropriate a polyhalogenoaromatic compound of the formula 3, the alkali metal sulphide, if appropriate together with an alkali metal hydroxide, and the tri-alkali metal phosphates can in principle be mixed and reacted in any form in the polar solvent to be used according to the invention. However, it is advantageous for at least most of the water to be removed before addition and reaction of the p-dihalogenobenzene, this water being in the form of water of hydration in the alkali metal sulphides and the alkali metal phosphates and/or in the free form as a mixing component of aqueous solutions of the sulphides and phosphates to be employed according to the invention.

Dehydration can be effected, for example, by distilling the water out of the reaction solution. In a preferred reaction procedure, the N-alkyllactam is initially introduced into the reaction vessel together with the phosphates according to the invention and the water of hydration or mixing water is removed in a first dehydration stage. The desired proportions of alkali metal sulphide are then added and a second dehydration stage is effected if necessary. Thereafter, the p-dihalogenobenzene and, if appropriate, the polyhalogeno compound of the formula 3 are added and the actual polymerisation reaction is initiated, whilst further increasing the temperature.

The temperature should be increased slowly in the dehydration stages in order to prevent the reaction mixture from foaming.

As soon as the boiling point of the solvent is reached, the actual polymerisation reaction can be started.

The reaction temperature for the polycondensation according to the invention is as a rule in the range from 160° C. to 285° C., preferably in the range from 190° to 275° C. The reaction time can be up to 60 hours, but is preferably between 2 and 15 hours. Stepwise increase of the reaction temperature over this period is advantageous.

As far as possible equimolar amounts of the p-dihalogenobenzene and the alkali metal sulphide are reacted. Accordingly, the molar ratio of p-dihalogenobenzene/alkali metal sulphide is preferably in the range from 0.98:1 to 1.02:1.

The polyhalogenoaromatic compounds of the formula 3 to be used according to the invention can be added in an amount of up to several mol %, relative to the p-dihalogenobenzene constituent, depending on the process conditions. However, an amount of 0 to 2.0 mol %, relative to the p-dihalogenobenzene constituent, is as a rule sufficient.

The amount of solvent can be chosen within wide limits, but is in general 1 to 10 mols per mol of alkali metal sulphide.

The amount of alkali metal hydroxide is chosen according to the proportions of alkali metal bisulphide in the technical grade alkali metal sulphide. It can be up to 0.8 mol per mol of alkali metal sulphide, but this amount can be exceeded if appropriate.

The alkali metal hydroxides used are, for example, lithium hydroxide, sodium hydroxide and potassium hydroxide or mixtures thereof. Alkali metal carbonates, such as lithium carbonate, sodium carbonate and potassium carbonate and mixtures thereof, can also be used for the same purpose.

The amount of alkali metal phosphates according to the invention can be varied depending on the process conditions, but is in general between 0.05 and 2 mols, preferably 0.1 and 1.5 mols, per mol of alkali metal sulphide.

The reaction mixture can be worked up in various ways.

The polyarylene sulphide can be separated off from the reaction solution by customary procedures, for example by filtration or by centrifuging, directly or only after the addition of, for example, water.

Washing with water generally follows the filtration in order to remove inorganic constituents, which can adhere to the polymers, such as, for example, the alkali metal sulphides or the phosphates according to the invention.

Washing or extraction with other wash liquids in addition to or after this washing, is, of course, also possible.

The polymer can also be obtained by stripping off the solvent in the reaction chamber and subjecting the product to subsequent washing as described above.

Compared with the uncatalysed preparation of polyarylene sulphides, polyarylene sulphides with a higher intrinsic viscosity and a lower melt flow are obtained by the process according to the invention.

In German Offenlegungsschriften Nos. 2,623,333 and 2,623,363, the intrinsic viscosity in 1-chloronaphthalene at 206° C. and at a concentration of 0.4 g of polymer/100 ml of solvent is measured as a reference value for the molecular weight. However, the danger of the formation of associates is relatively great in this temperature and concentration range. The polyarylene sulphides according to the invention are therefore characterised by determining the intrinsic viscosity $[\eta]$, which is obtained by measuring intrinsic viscosities and extrapolating the concentration to zero.

$$[\eta] = \frac{\ln \eta_{rel}}{C} \left( C \rightarrow 0 \right)$$

The low melt flow of the polyarylene sulphides according to the invention compared with that of polyarylene sulphides obtained without catalysis offers particular advantages from the point of view of process technology. (The melt index is measured in accordance with the method of ASTM D 1238-70, using a 5 kg weight and altering the temperature to 316° C., the value being expressed in g/10 minutes).

Since the melt flow of the polyarylene sulphides according to the invention is in the range from 1-700 g/10 minutes, preferably 1-250 g/10 minutes, an additional hardening stage, which is otherwise necessary, can be spared and the products can be processed directly, without further hardening, by extrusion, extrusion blow moulding, injection-moulding or other customary processing methods, to give films, shaped articles or fibres which are used in the customary manner as automobile components, fittings, electrical components, such as, for example, switches and printed circuit boards, chemical-resistant components and equipment, such as pump housings and pump vanes, etching bath dishes, sealing rings, components for office machines and telecommunication equipment, and domestic appliances, valves, ballbearing components and the like.

The properties of the polyarylene sulphides can be modified or optimised by additional processing steps, such as, for example, heat treatment or mixing with other components.

The polyarylene sulphides according to the invention can also be mixed with other polymers, with pigments and with fillers, such as, for example, graphite, metal powders, glass powder, quartz flour or glass fibres, or the additives customary for polyarylene sulphides, such as, for example customary stabilisers or mould release agents, can be added.

EXAMPLE 1

This example describes, as a comparison example, the preparation of a polyphenylene sulphide without the catalysis according to the invention (U.S. Pat. No. 3,354,129).

130 g (1.0 mol/60% strength) of sodium sulphide ($Na_2S \times H_2O$) and 300 g of N-methyl-2-pyrrolidone were brought together in an autoclave provided with a stirrer. The mixture was flushed with nitrogen and warmed slowly to 202° C. A total of 29 ml of water thereby distilled off. The batch was then cooled down to about 160° C. and 147 g of p-dichlorobenzene in about 50 g of N-methyl-2-pyrrolidone were added. The reaction mixture was warmed, under an initial nitrogen pressure of 2.5 bars, to 245° C. in the course of 30 minutes, during which the pressure rose to 10 bars, and this temperature was maintained for 3 hours. After cooling the mixture to room temperature, a grey solid was isolated and was then subjected to thorough washing with water to remove the concomitant inorganic materials.

The product was dried at 80° C. in vacuo and 100.3 g (93%) of poly-(p-phenylene sulphide) with the following characteristics were obtained:
Intrinsic viscosity $[\eta]$: 10.2
Melt index, g/10 minutes: 2,400

EXAMPLE 2

Trisodium phosphate hydrate $Na_3PO_4 \times 12\ H_2O$ was used as a catalyst in the process according to the invention.

712.7 g (1.87 mols) of trisodium phosphate hydrate were initially introduced into the reaction vessel, together with 1,000 ml of N-methyl-2-pyrrolidone. The batch was dehydrated under nitrogen by slowly heating to 165° C. 415 ml of distillate which contained 97% of water were obtained. 245.7 g of 60% strength sodium sulphide (1.87 mols) and 11.7 g of sodium hydroxide in 40 ml of water were then added. The second dehydration stage was then carried out accordingly, the temperature being increased to 202° C. 162 ml of a distillate containing 140 ml of water was collected.

After cooling the mixture to 160° C. 275.6 g (1.87 mols) of p-dichlorobenzene and 2.72 g (0.8 mol %, relative to the p-dichlorobenzene constituent) of 1,2,4-trichlorobenzene in 120 ml of N-methyl-2-pyrrolidone were added and the batch was reacted in an autoclave with a stirrer according to the following pressure/temperature programme:

1 hour at 210° C. and under 3 bars
2 hours at 245° C. and under 10.5 bars
3 hours at 265° C. and under 12 bars The batch was then cooled down and after diluting the reaction mixture with water and subsequently washing the mixture with water, 200.4 g (99%) of poly-p-phenylene sulphide were isolated as a grey solid with the following characteristics:

Intrinsic viscosity [η]: 26
Melt index, g/10 minutes: 82

EXAMPLE 3

In comparison with Example 2, only one dehydration stage was effected in this example:

712.7 g (1.87 mol) of trisodium phosphate hydrate were initially introduced into the reaction vessel, under nitrogen, together with 245.7 g of 60% strength sodium sulphide (1.87 mols) and 11.7 g of sodium hydroxide in 40 g of water and 1,000 ml of N-methyl-2-pyrrolidone.

The temperature was increased slowly to 202° C., whereupon 509 ml of water distilled off, together with 45 ml of N-methyl-2-pyrrolidone. 275.6 g (1.87 mols) of p-dichlorobenzene and 2.04 g (0.6 mol %, relative to the p-dichlorobenzene constituent) of 1,2,4-trichlorobenzene were then added and the batch was reacted according to the same pressure/temperature programme as in Example 2. After filtering off the product and washing it with water, 200.3 g (99%) of poly-p-phenylene sulphide were obtained.

Intrinsic viscosity [η]: 17
Melt index, g/10 minutes: 320

EXAMPLE 4

In this example, the catalytically active trisodium phosphate is produced directly in the reaction solution:

A mixture of 225 g of sodium hydroxide in 250 g of water, and 306.25 g of 60% strength phosphoric acid were carefully brought together in 1,000 ml of N-methyl-2-pyrrolidone under a nitrogen atmosphere, the exothermic neutralisation reaction being taken into consideration.

Whilst slowly increasing the temperature of the reaction mixture to 165° C., 360 g of water were then distilled off in the form of a N-methyl-2-pyrrolidone/water mixture containing 92% of water.

245.7 g of 60% strength sodium sulphide (1.87 mols) and 20 g of sodium hydroxide in 40 g of water were then added.

The second dehydration stage was then carried out accordingly, the temperature being increased to 202° C. 168 ml of distillate containing 142 ml of water were collected.

After cooling the mixture to 160° C., 275.6 g (1.87 mols) of p-dichlorobenzene and 2.72 g (0.8 mol %, relative to the p-dichlorobenzene constituent) of 1,2,4-trichlorobenzene in 120 ml of N-methyl-2-pyrrolidone were added and the batch was reacted in an autoclave with a stirrer according to the pressure/temperature programme in Example 2. Working up was also carried out according to Example 2.

Yield: 119.8 g (99%) of poly-p-phenylene sulphide

Intrinsic viscosity [η]: 25
Melt index, g/10 minutes: 92

EXAMPLE 5

The reaction procedure corresponds to that in Example 2. However, in comparison with Example 2, only half the amount of trisodium phosphate hydrate $Na_3PO_4 \cdot 12H_2O$ (356.3 g = 0.937 mol) was now employed.

200.6 g (99%) of poly-p-phenylene sulphide were obtained.

Intrinsic viscosity [η]: 22
Melt index, g/10 minutes: 120

EXAMPLE 6

The reaction procedure is as in Example 2, but 249.65 g (0.937 mol) of tripotassium phosphate hydrate $K_3PO_4 \times 3H_2O$ were employed instead of the trisodium phosphate hydrate.

199.5 g (99%) of poly-p-phenylene sulphide were obtained.

Intrinsic viscosity [η]: 19
Melt index, g/10 minutes: 260

EXAMPLE 7

In this example, the tripotassium phosphate is produced in the reaction medium, from potassium dihydrogen phosphate and potassium hydroxide.

A mixture of 127.5 g (0.937 mol) of potassium dihydrogen phosphate and 150 g of water, and 105.1 g (1.87 mols) of KOH in 100 g of water were carefully brought together in 1,000 ml of N-methyl-2-pyrrolidone, the heat of neutralisation being taken into consideration. During subsequent dehydration, a total of 221 ml of water were distilled off by slowly heating the mixture to 170° C.

245.7 g of 60% strength sodium sulphide (1.87 mols) and 20 g of sodium hydroxide in 40 g of water were then added.

The second dehydration stage was effected analogously to Example 2, a total of 140 ml of water being distilled off.

After cooling the mixture to 160° C., 275.6 g (1.87 mols) of p-dichlorobenzene and 2.72 g (0.8 mol %, relative to the p-dichlorobenzene constituent) of 1,2,4-trichlorobenzene in 120 ml of N-methyl-2-pyrrolidone were added, and the batch was further reacted as in Example 2.

Intrinsic viscosity [η]: 20
Melt index, g/10 minutes: 218

We claim:

1. In the process for preparing a polyarylene sulphide by polycondensing at a temperature of from 160°–285° C. for up to 60 hours (a) a p-dihalogenobenzene which consists of 50–100 mol % of a compound of the formula

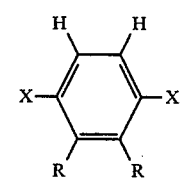

and 0–50 mol % of a compound of the formula

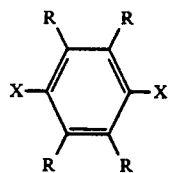

wherein X is fluorine, chlorine, bromine or iodine and each R is independently selected from the group consisting of hydrogen, $C_1$-$C_{20}$-alkyl, $C_5$-$C_{20}$-cycloalkyl, $C_6$-$C_{24}$-aryl, $C_7$-$C_{24}$-alkaryl and $C_7$-$C_{24}$-aralkyl with the proviso that at least one R is other than hydrogen; and (b) 0–2.0 mol %, based on (a), of a compound of the formula $ArX_n$ wherein Ar is an aromatic radical having 6 to 24 carbon atoms and at least 3 free valencies, X is as aforesaid and n is at least 3 with (c) an alkali metal sulphide in (d) a polar solvent, the molar ratio of (a) to (c) being from 0.98:1 to 1.02:1 and the molar ratio of (c) to (d) being from 1:2 to 1:10, the improvement wherein said polycondensation is carried out in the presence of 0.05–2.0 mols of tri-alkali metal phosphate per mol of (c).

2. The process of claim 1 wherein the polycondensation is carried out from 2 to 15 hours.

3. The process of claim 1 wherein said polycondensation temperature is from 190°–275° C.

4. The process of claim 1 wherein said polycondensation is carried out in the presence of 0.1 to 1.5 mols of tri-alkali metal phosphate per mol of (c).

5. The process of claim 1 wherein the polycondensation is carried out in the presence of tri-sodium phosphate or tri-potassium phosphate or a mixture thereof.

6. The process of claim 1 wherein the tri-alkali metal phosphate is used in the form of its hydrate or in aqueous mixture and the polycondensation reaction mixture is dehydrated at least once before introducing (a).

7. The process of claim 6 wherein the hydrate of or an aqueous mixture of tri-sodium phosphate is employed.

8. The process of claim 6 wherein the hydrate of or an aqueous mixture of tri-potassium phosphate is employed.

* * * * *